United States Patent Office 3,637,589
Patented Jan. 25, 1972

3,637,589
METHOD FOR PREPARING POLY-CARBORANYL-ENESILOXANE POLYMERS
Herbert R. Kwasnik, Silver Spring, Md., and John F. Sieckhaus, Milford, and Karl O. Knollmueller, Hamden, Conn., assignors to Olin Corporation
No Drawing. Filed May 28, 1970, Ser. No. 41,598
Int. Cl. C08g 31/30
U.S. Cl. 260—46.5 E          8 Claims

ABSTRACT OF THE DISCLOSURE

This invention relates to the method for the preparation of linear poly-meta(-m-) and para (-p-) carboranylenesiloxanes by the controlled hydrolytic condensation of selected silicon-containing carboranes.

For example, 1.473 moles of $H_2O$ in 400 ml. tetrahydrofuran was added over a period of 30 minutes to a flask cooled with an ice-bath and containing 1.052 moles of bis(1,1,3,3 - tetramethyl - 3 - chlorodisiloxane) - m-carborane and 2100 mol. of diethyl ether. Stirring was continued for another 30 minutes; the flask was warmed to 25° C. and after 2½ hours, the solvents were stripped under reduced pressure. After removing the last traces of solvent the polymer obtained had a number average molecular weight of 10,000.

The polymers obtained by the controlled hydrolytic condensation have utility as high temperature liquids and coatings, gaskets. O-rings, encapsulation materials, heat resistant adhesives and in liquid partitioning phases used in vapor phase chromatography.

---

This invention relates to the improved method for the preparation of linear polycarboranylenesiloxanes. More particularly this invention relates to the preparation of linear poly-meta (-m-) and para (-p-) carboranylenesiloxanes by the controlled hydrolytic condensation of selected silicon containing carboranes.

Previously the poly - m - carboranylenesiloxanes have been prepared by high temperature, ferric chloride catalyzed copolymerization of an alkoxy substituted neocarborane with a halogen containing silane, siloxane, or silyl carborane as shown in U.S. Pats. 3,388,090 to '093. While the polymers produced by this method are generally considered satisfactory, the method has the disadvantages of requiring high temperatures, many of the polymers produced are generally insoluble in common organic solvents and the molecular weight while varying over a wide range is not controllable to any large degree.

Now it has been found that the above-described disadvantages are obviated by the method of this invention wherein linear poly-m- and -p-carboranylenesiloxanes can be conveniently and economically prepared by the controlled hydrolytic condensation of selected silicon containing carboranes. These carboranylenesiloxane polymers formed have recurring units of the formula below:

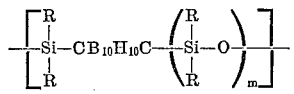

wherein each R is an independently selected alkyl group of 1 to 8 carbon atoms or an aryl group of up to 10 carbon atoms and $m$ represents a number of repeating units and will depend on the particular starting material used. It is further noted that henceforth in the specification and claims, the radicals —$CB_{10}H_{10}C$— (as shown above) and $B_{10}H_{10}C_2$— are utilized to represent both of the well-known -m- and -p-carborane cage structures as shown for example in U.S. Pat. 3,397,221.

The polymers prepared by the method of this invention have utility in a wide variety of applications including, for example, use as high temperature liquids and coatings, gaskets, O-rings, encapsulation materials, heat resistant adhesives and in liquid partitioning phases used in vapor phase chromatography. Additionally these polymers can be cured at room temperature with tetrafunctional silanes and metal soap catalysts to give elastomers with outstanding thermal properties.

More particularly this invention relates to the controlled hydrolytic condensation of select halogen containing organosiloxanes at low temperatures in the presence of an inert organic solvent as shown by the following equation wherein for example, bis(1,1,3,3-tetramethyl-3-chlorodisiloxanyl)-m-carborane is the starting material:

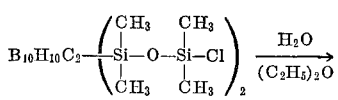

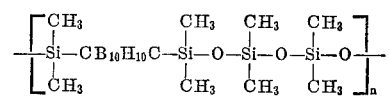

where $n$ represents a number of repeating units.

This reaction was somewhat surprising in view of the inability to form siloxane linkages by the hydrolytic condensation of bis(halosilyl)carboranes.

In addition to the preparation of the polymers as described above, copolymers of organosiloxanes and dihalosilanes or dihalosiloxanes can be prepared in a similar manner using hydrolytic condensation as shown by the following equation wherein for exampe, bis(1,1,3,3-tetramethyl-3-chlorodisiloxanyl) - m - carborane and methylphenyldichlorosilane are the starting materials:

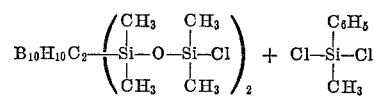

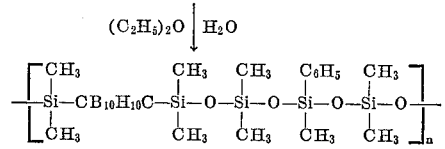

where $n$ represents a number of repeating units.

The halogen containing organo-siloxanes which are suitable for use as starting materials in the method of this invention are shown by the following formula:

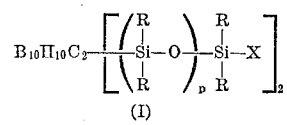

(I)

wherein X is a halogen selected from the group consisting of chlorine, bromine and iodine; each R is an independently selected alkyl group of 1 to 8 carbon atoms or an aryl group of 6 to 10 carbon atoms and $p$ is 1 or 2. Thus, for example the R substituent may be methyl, ethyl, butyl, octyl, phenyl, tolyl, xylyl or naphthyl.

Basically these halogen containing organosiloxanes (I) are prepared by reacting -m- or -p-carborane with an alkali metal to form the corresponding di(alkali metal) derivative of the starting compound which in turn is reacted with the desired halogen containing disiloxane as shown for example in U.S. Pat. 3,397,221. Illustrative of the above-described halogen containing starting materials are the following -m- or -p-carborane compounds:

bis(1,1,3,3-tetramethyl-3-chlorodisoloxanyl)carborane,
bis(1,1,3,3-tetramethyl-3-bromodisiloxanyl)carborane, bis(1,1,3,3-tetraethyl-3-chlorodisiloxanyl)carborane,
bis(1,1,3,3-tetraethyl-3-bromodisiloxanyl)carborane,
bis(1,1,3,3-tetrapropyl-3-chlorodisiloxanyl)carborane,
bis(1,1,3,3-tetrapropyl-3-iododisiloxanyl)carborane,
bis(1,1,3-trimethyl-3-xylyl-3-chlorodisiloxanyl)
  carborane,
bis(1,1,3,3-tetrabutyl-3-chlorodisiloxanyl)carborane,
bis(1,1,3,3-tetrapentyl-3-chlorodisiloxanyl)carborane,
bis(1,1,3,3-tetraphenyl-3-chlorodisiloxanyl)carborane,
bis(1,1,3-trimethyl-3-xylyl-3-chlorodiiloxanyl)-
  carborane,
bis(1,1,3,3,5,5-hexamethyl-5-chlorotrisiloxanyl)
  carborane,
bis(1,1-diethyl-3,3,5,5-tetramethyl-5-tetramethyl-5-
  bromotrisiloxanyl)carborane,
bis(1,1,3,3,5,5-hexaphenyl-5-chlorotrisiloxanyl)
  carborane,
bis(1-ethyl-1-methyl-3,3-dipropyl-2-chlorodisiloxanyl)
  carborane.

The halosubstituted silanes or siloxanes used in the copolymerization of the organosiloxanes are well-known commercial materials having the following formula:

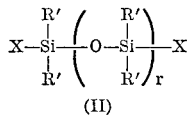

(II)

wherein X is a halogen selected from the group consisting of chlorine, bromine and iodine; each R' is an independently selected alkyl group of from 1 to 6 carbon atoms or an aryl group from 1 to 6 carbon atoms or an aryl group of 6 to 8 carbon atoms; and $r$ is an integer of 0 to 3. Illustrative of these materials are the following:

dimethyldichlorosilane,
diphenyldichlorosilane,
methylphenyldichlorosilane,
tetramethyldichlorodisiloxane,
tetramethyldibromodisiloxane,
dimethyldi-n-propyldichlorodisiloxane,
tetraethyldiiododisiloxane,
ethyldimethyl-n-propyldisiloxane,
tetraisopropyldichlorodisiloxane,
tetrahexyldichlorodisiloxane,
diheptyldi-n-octyldichlorodisiloxane,
diethyldiphenyldichlorodisiloxane,
dimethylditolyldibromodisiloxane,
hexamethyldichlorotrisiloxane,
dimethyltetraethyldibromotrisiloxane,
di-n-propyldimethyldixylyldibromotrisiloxane,
hexaphenyldiiodotrisiloxane,
tetraphenyldimethyldichlorotrisiloxane,
octamethyldichlorotetrasiloxane,
ethylisobutylhexaphenyldichlorotetrasiloxane, and
octaphenyldichlorotetrasiloxane.

Further illustrations of these compounds and the method for preparing them are disclosed in J. Am. Chem Society, V. 74, p. 386, 1952, "Synthesis of Methylphenylsiloxanes" by William H. Daudt and J. Franklin Hyde.

The hydrolytic condensation reaction of this invention may be carried out over a wide temperature range depending on the particular solvent that is used and generally the temperature will range from 0 to 100° C. with the preferred range being 10 to 35° C.

The amount of water used in carrying out the reaction of this invention can be varied widely, however, the molecular weight distribution of the resulting polymer can be controlled within a fairly specific range by controlling the mole ratio of water to monomer (I). Generally the mole ratio of water to monomer (I) is maintained between 1:1 to 1.6:1 with the preferred range being 1.2:1 to 1.4:1. Generally, polymers having molecular weights of up to about 30,000 (number average by vapor phase osmometry) can be prepared.

The hydrolytic condensation may be carried out in the presence of a wide variety of inert organic solvents, i.e. solvents which are not reactive with anything in the reaction system, such as, for example, aliphatic and aromatic ethers, aliphatic and aromatic hydrocarbons, halogenated aliphatic and aromatic hydrocarbons and mixtures thereof. Illustrative of such compounds are the following: diethyl ether, methyl ethyl ether, diisopropyl ether, di-n-propyl ether, di-n-butyl ether, ethyl-n-butyl ether, ethylene glycol dimethyl ether, diethylene glycol monomethyl ether, dioxane, tetrahydrofuran, pentane, hexane, heptane isooctane, isoheptene, benzene, toluene, xylene, cyclohexane, methylene chloride, methyl bromide, chloroform, carbon tetrachloride and monochlorobenzene. Further illustrations of solvents of the type which may be used in this invention are disclosed in "Industrial Solvents" by Ibert Mellan, 2nd Edition, 1950. While any inert organic solvent may be used, the preferred solvent is diethyl ether.

The copolymerization and hydrolytic condensation of halogen containing organosiloxane monomer (I) with the halo-substituted silanes or siloxanes (II) will generally be carried out using the same conditions as those previously described for the hydrolytic condensation of monomers (I). The mole ratio of organosiloxane monomer (I) to silane will vary widely depending on the desired formulation and properties of the resulting polymer. More particularly the mole ratio of monomer (I) to silane or siloxane (II) will vary from 1:1 to 100:1 with equimolar amounts being preferred.

The method of this invention is further illustrated by the following examples.

EXAMPLE I

All operations were conducted under nitrogen. A 5 liter 3-neck flask equipped with a truebore stirrer, dropping funnel and thermometer was charged with 502.6 g. (1.052 mole) of bis(1,1,3,3 - tetramethyl-3-chlorodisiloxane)-m-carborane and 2100 ml. of diethyl ether. The flask was cooled with an ice bath and 26.527 g. (1.473 moles) of $H_2O$ in 400 ml. tetrahydrofuran (THF) was added over a period of 30 minutes. Stirring was continued for an additional 30 minutes and no significant temperature change was noted. The flask was warmed to 25° C. and after continued stirring for 2½ hours, the solvents were stripped under reduced pressure. Last traces of solvent were removed from the viscous liquid product by continuous pumping at 0.5 mm. Hg and 30–35° C. for 24 hours and then at room temperature for 3 days. After 30 hours at room temperature, the liquid turned to a wax (melting point 30–40° C.), yield 422 g. (95%). The polymer obtained had a number average molecular weight of 10,000 (by vapor phase osmometry—VPO) with a gel permeation chromatogram (GPC) peak maximum of 16,000–20,000.

*Analysis.*—Calculated for $C_{10}H_{34}B_{10}O_3Si_4$ (percent): C, 28.38; H, 7.66; B, 25.58; Si, 25.95. Found (percent): C, 28.41; H, 8.11; B, 25.57; Si, 26.56.

On the basis of the elemental analysis, nuclear magnetic resonance (NMR) and molecular weight data, it was determined that the product consisted essentially of recurring units of the formula:

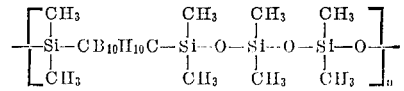

with $n$ being about 47.

EXAMPLE II

The same procedure as in Example I was followed using 5.0 g. (0.0104 mole) of bis(1,1,3,3-tetramethyl-3-chlorodisiloxane)-m-carborane in 20 ml. of diethyl ether and 0.188 g. (0.0104 mole) $H_2O$ in 3 ml. THF. VPO showed a number average molecular weight of 9100 but the distribution ranged to 25,000 with the greatest percentage of material having a molecular weight of about 13,000.

*Analysis.*—Calculated for $C_{10}H_{34}B_{10}O_3Si_4$ (percent): C, 28.30; H, 7.66; B, 25.58; Si, 25.95. Found (percent): C, 28.41; H, 8.11; B, 25.57; Si, 26.56.

On the basis of the elemental analysis, nuclear magnetic resonance (NMR) and molecular weight data, it was determined that the product consisted essentially of recurring units of the formula shown in Example I with $n$ being about 30–35.

EXAMPLES III TO V

The same procedure as in Example II was followed with the water to bis(1,1,3,3 - tetramethyl-3-chlorodisiloxane)-m-carborane ratios of 1.2:1; 1.4:1; and 1.6:1. VPO showed number average molecular weights of 11,000, 15,000 and 10,000 respectively and major GPC peaks at 31,000 ($n$ of 73); 33,000 ($n$ of 78) and 21,000 ($n$ of 50) respectively.

EXAMPLE VI

Using the same procedure as in Example I, 62.87 g. (0.1 mole) of bis(1,1,3,3,5,5 - hexamethyl-5-chlorotrisiloxane)-m-carborane in 350 ml. diethyl ether was added to 2.53 g. (0.14 mole) of $H_2O$ in 35 ml. THF over a 20 minute period. After stirring for 1 hour at 0° C. and 2.5 hours at 25° C., the solvents were removed at reduced pressure and pumping of the residue for 4 days in vacuo over NaOH produced a viscous liquid product. The high molecular weight fraction was isolated by dissolving this material in 150 ml. diethyl ether and slowly adding 300 ml. methanol. The precipitate was allowed to settle and the supernatant liquid was decanted. The procedure was repeated and the precipitate was dried at 40° C. in vacuo. The polymer produced had a number average molecular weight of 21,000 (VPO).

*Analysis.*—Calculated for $C_{14}H_{46}B_{10}O_3Si_6$ (percent): C, 29.53; H, 8.03; B, 19.14. Found (percent): C, 29.44; H, 8.12; B, 18.94.

EXAMPLE VII

The same procedure as in Example I was followed using 9.42 g. (0.01971 mole) of bis(1,1,3,3-tetramethyl-3-chlorodisiloxane)-p-carborane in 39.5 ml. of diethyl ether and 0.497 g. $H_2O$ (0.02759 mole) in 4.85 ml. THF. The resulting product had a melting range of 124 to 131° C., a GPC peak maximum molecular weight at 5500, and a structure consisting essentially of recurring units of the formula shown in Example I (as verified by NMR analysis).

EXAMPLE VIII

Using a procedure similar to Example I, a 2-liter flask was charged with 100 g. (0.209 mole) of bis(1,1,3,3-tetramethyl-3-chlorodisiloxane)-m-carborane, 40.95 g. (0.214 mole) of methylphenyldichlorosilane and 675 ml. of diethyl ether. After addition of 10.7 g. (0.593 mole) of $H_2O$ in 70 ml. THF over a 45 minute period, the solution was stirred for 2.5 hours at 25° C. The solvents were then removed at reduced pressure and the residual viscous liquid was stored over KOH in vacuo (continuous pumping) for 5 days. After precipitation from ether with methanol, the resulting product had a GPC maximum peak at 15,000 to 17,000 and a structure (verified by NMR analysis) consisting essentially of recurring units of the formula:

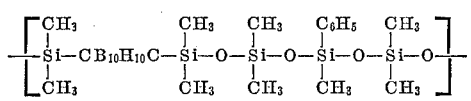

What is claimed is:

1. A method for preparing linear -m- and -p- carboranylenesiloxane polymers comprising hydrolytically condensing a compound of the formula:

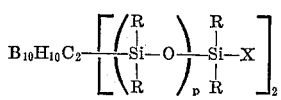

wherein X is a halogen selected from the group consisting of chlorine, bromine and iodine; each R is independently selected from the group consisting of alkyl of 1 to 8 carbon atoms and aryl of 6 to 10 carbon atoms; and $p$ is 1 or 2 with water in a molar ratio of 1.2:1 to 1.4:1 moles of water to moles of said compound in the presence of an inert organic solvent.

2. The method of claim 1 wherein said compound is bis(1,1,3,3-tetramethyl-3-chlorodisiloxane)-m-carborane.

3. The method of claim 1 wherein said compound is bis(1,1,3,3,5,5 - hexamethyl - 5-chlorotrisiloxane)-m-carborane.

4. The method of claim 1 wherein said compound is bis(1,1,3,3-tetramethyl-3-chlorodisiloxane)-p-carborane.

5. A method for preparing linear -m- and -p-carboranylenesiloxane copolymers comprising hydrolytically condensing in the presence of water and an inert organic solvent, a compound of the formula:

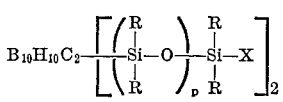

wherein X is a halogen selected from the group consisting of chlorine, bromine and iodine; each R is independently selected from the group consisting of alkyl of 1 to 8 carbon atoms and aryl of 6 to 10 carbon atoms; and $p$ is 1 or 2
and a material of the formula:

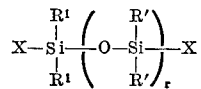

wherein X is a halogen selected from the group consisting of chlorine, bromine and iodine; each R' is independently selected from the group consisting of alkyl of from 1 to 6 carbon atoms and aryl of 6 to 8 carbon atoms; and $r$ is an integer of 0 to 3 wherein the mole ratio of water to said compound is from 1:1 to 1.6:1.

6. The method of claim 5 wherein the mole ratio of said compound to said material is from 1:1 to 100:1.

7. The method of claim 5 wherein said compound is bis(1,1,3,3 - tetramethyl-3-chlorodisiloxane)-m-carborane and said material is methylphenyldichlorosilane.

8. The method of claim 5 wherein the mole ratio of water to said compound is from 1.2:1 to 1.4:1.

References Cited

UNITED STATES PATENTS

| | | | |
|---|---|---|---|
| 3,354,193 | 11/1967 | Fein et al. | 260—448.2 |
| 3,397,221 | 8/1968 | Papetti | 260—448.2 |
| 3,431,234 | 3/1969 | Fein et al. | 260—46.5 |
| 3,445,427 | 5/1969 | Larchar | 260—46.5 |
| 3,457,222 | 7/1969 | Papetti | 260—46.5 |
| 3,463,801 | 8/1969 | Papetti et al. | 260—448.2 |
| 3,120,500 | 2/1964 | Huntington et al. | 260—46.5 |

OTHER REFERENCES

"New Organoborane Compounds Are Stable," Chemical and Engineering News, Dec. 9, 1963, p. 63.

DONALD E. CZAJA, Primary Examiner

M. I. MARQUIS, Assistant Examiner

U.S. Cl. X.R.

117—161 ZA; 260—18 S, 46.5 G, 448.2 N

UNITED STATES PATENT OFFICE
CERTIFICATE OF CORRECTION

Patent No. 3,637,589         Dated January 25, 1972

Inventor(s) Herbert R. Kwasnik, John F. Sieckhaus and Karl O. Knollmueller

It is certified that error appears in the above-identified patent that said Letters Patent are hereby corrected as shown below:

Column 1, line 29 "gasket." should read --gaskets--.

Column 3, line 5, delete "bis(1,1,3-trimethyl-3-xylyl-3-chlorodisiloxanyl)carborane" and insert the following --bis(1,1,3-triisopropyl-3-hexyl-3-chloro-disiloxanyl) carborane--.

Column 3, line 10, that portion of the formula reading "chlorodiiloxanyl)-" should read -- chlorodisiloxanyl)- --.

Column 3, line 18, insert --bis(1,1,3,3,5-pentamethyl-5-lyl-5-chlorotrisiloxanyl)carborane--.

Column 4, line 38 "mole)" should read --moles)--.

Column 6, claim 5, second formula, that portion of the formula reading

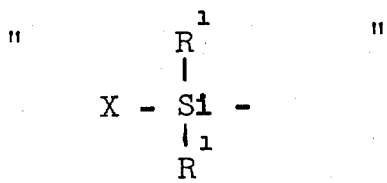

should read

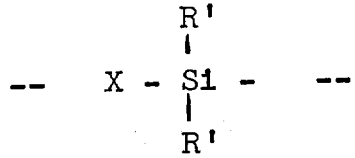

Signed and sealed this 20th day of March 1973.

(SEAL)
Attest:

EDWARD M. FLETCHER, JR.
Attesting Officer

ROBERT GOTTSCHALK
Commissioner of Patents